US012675648B2

(12) United States Patent
Gao et al.

(10) Patent No.: US 12,675,648 B2
(45) Date of Patent: Jul. 7, 2026

(54) LANGUAGE MODEL TRAINING APPARATUS, LANGUAGE MODEL TRAINING METHOD, AND STORAGE MEDIUM

(71) Applicant: KABUSHIKI KAISHA TOSHIBA, Tokyo (JP)

(72) Inventors: Pengju Gao, Yokohama Kanagawa (JP); Tomohiro Yamasaki, Tokyo (JP); Masahiro Ito, Tokyo (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 157 days.

(21) Appl. No.: 18/533,569

(22) Filed: Dec. 8, 2023

(65) Prior Publication Data

US 2024/0242039 A1 Jul. 18, 2024

Related U.S. Application Data

(63) Continuation-in-part of application No. 18/458,506, filed on Aug. 30, 2023, now abandoned.

(30) Foreign Application Priority Data

Jan. 12, 2023 (JP) ................................. 2023-003209
Dec. 1, 2023 (JP) ................................. 2023-203831

(51) Int. Cl.
*G06F 40/40* (2020.01)
*G06F 40/242* (2020.01)
*G06F 40/284* (2020.01)

(52) U.S. Cl.
CPC ............ *G06F 40/40* (2020.01); *G06F 40/242* (2020.01); *G06F 40/284* (2020.01)

(58) Field of Classification Search
None
See application file for complete search history.

(56) References Cited

U.S. PATENT DOCUMENTS 9,740,685 B2 * 8/2017 Beaurpere ............. G06F 40/242
10,289,962 B2 5/2019 Vinyals et al.
(Continued)

OTHER PUBLICATIONS

Feng et al. "Learning to Augment for Data-Scarce Domain Bert Knowledge Distillation". Proceedings of the AAAI Conference on Artificial Intelligence, 35(8), 7422-7430, 2021 (Year: 2021).*
(Continued)

*Primary Examiner* — Jesse S Pullias
(74) *Attorney, Agent, or Firm* — Finnegan, Henderson, Farabow, Garrett & Dunner, LLP

(57) ABSTRACT

A language model training apparatus obtains a target sentence including a sequence of a word that is a known word or a new word. The apparatus generates position information of a new word included in the target sentence and a token sequence that is a sequence of an identifier of the word included in the target sentence. The token sequence includes a first token sequence for a teacher model and a second token sequence for a student model. The first token sequence and the second token sequence are different in at least some of a processed word. The apparatus updates a parameter of the student model utilizing knowledge distillation from the teacher model to the student model based on the position information, the first token sequence, and the second token sequence.

16 Claims, 10 Drawing Sheets

(56)  References Cited

U.S. PATENT DOCUMENTS

| | | | |
|---|---|---|---|
| 11,030,402 B2 * | 6/2021 | Ristoski | G06F 40/30 |
| 11,568,141 B2 * | 1/2023 | Howell | G06N 3/082 |
| 11,620,515 B2 * | 4/2023 | Liu | G06F 40/30 |
| | | | 706/45 |
| 2021/0142164 A1 * | 5/2021 | Liu | G06F 40/40 |

OTHER PUBLICATIONS

Yao et al. "Adapt-and-Distill: Developing Small, Fast and Effective Pretrained Language Models for Domains". arXiv:2106.13474v2 [cs.CL] Jun. 29, 2021 (Year: 2021).*

Jiao et al. "TinyBert: Distilling Bert for Natural Language Understanding". arXiv:1909.10351v5 [cs.CL] Oct. 16, 2020 (Year: 2020).*

Wang et al. "MiniLM: Deep Self-Attention Distillation for Task-Agnostic Compression of Pre-Trained Transformers". arXiv:2002.10957v2 [cs.CL] Apr. 6, 2020 (Year: 2020).*

Victor Sanh et al., "DistilBert, a distilled version of Bert: smaller, faster, cheaper, and lighter," 33$^{rd}$ Conf. on Neural Info. Proc. Sys. (NeurIPS 2019), arXiv:1910.01108v4, 5 pages (2020).

* cited by examiner

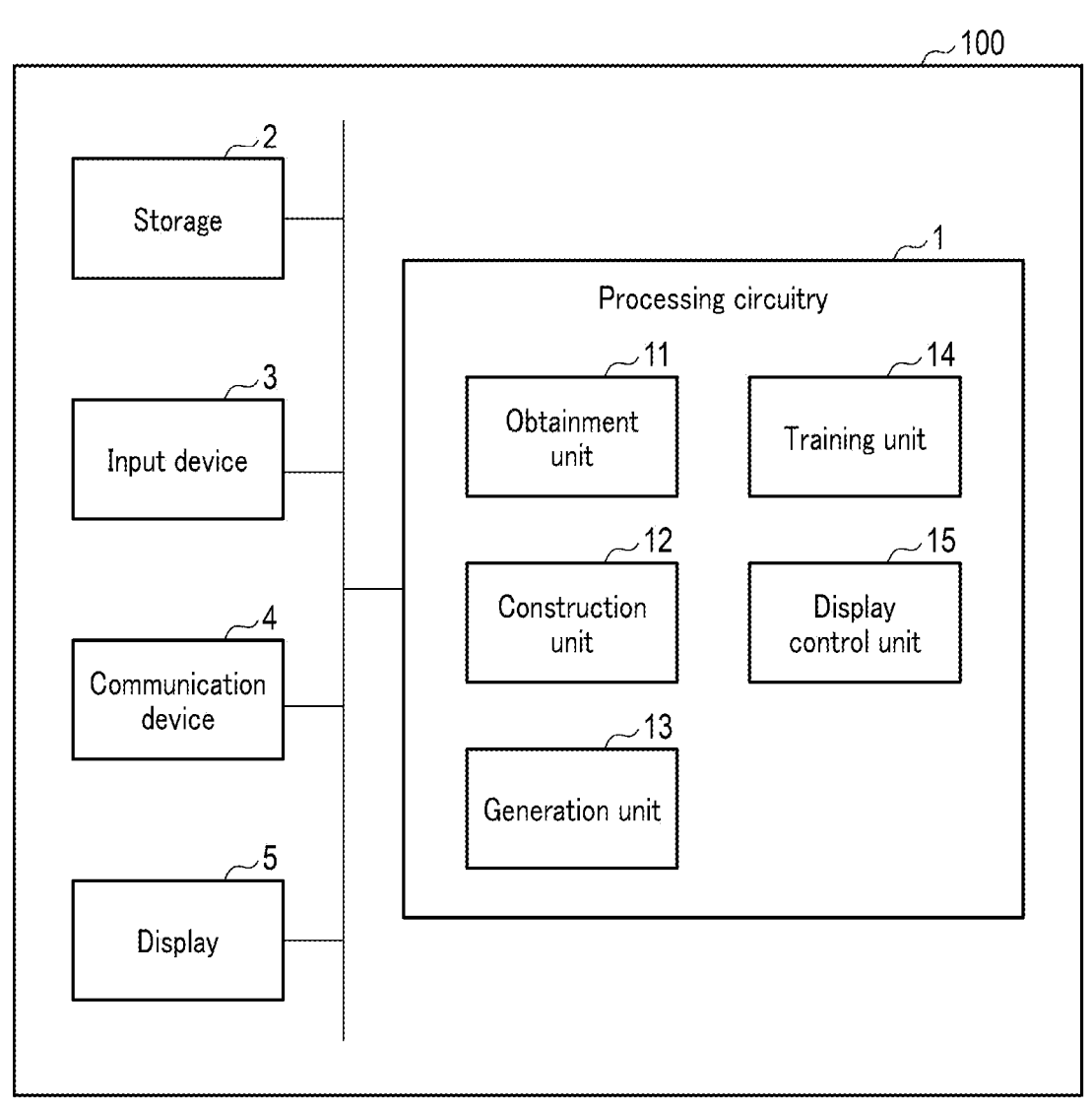
F I G. 1

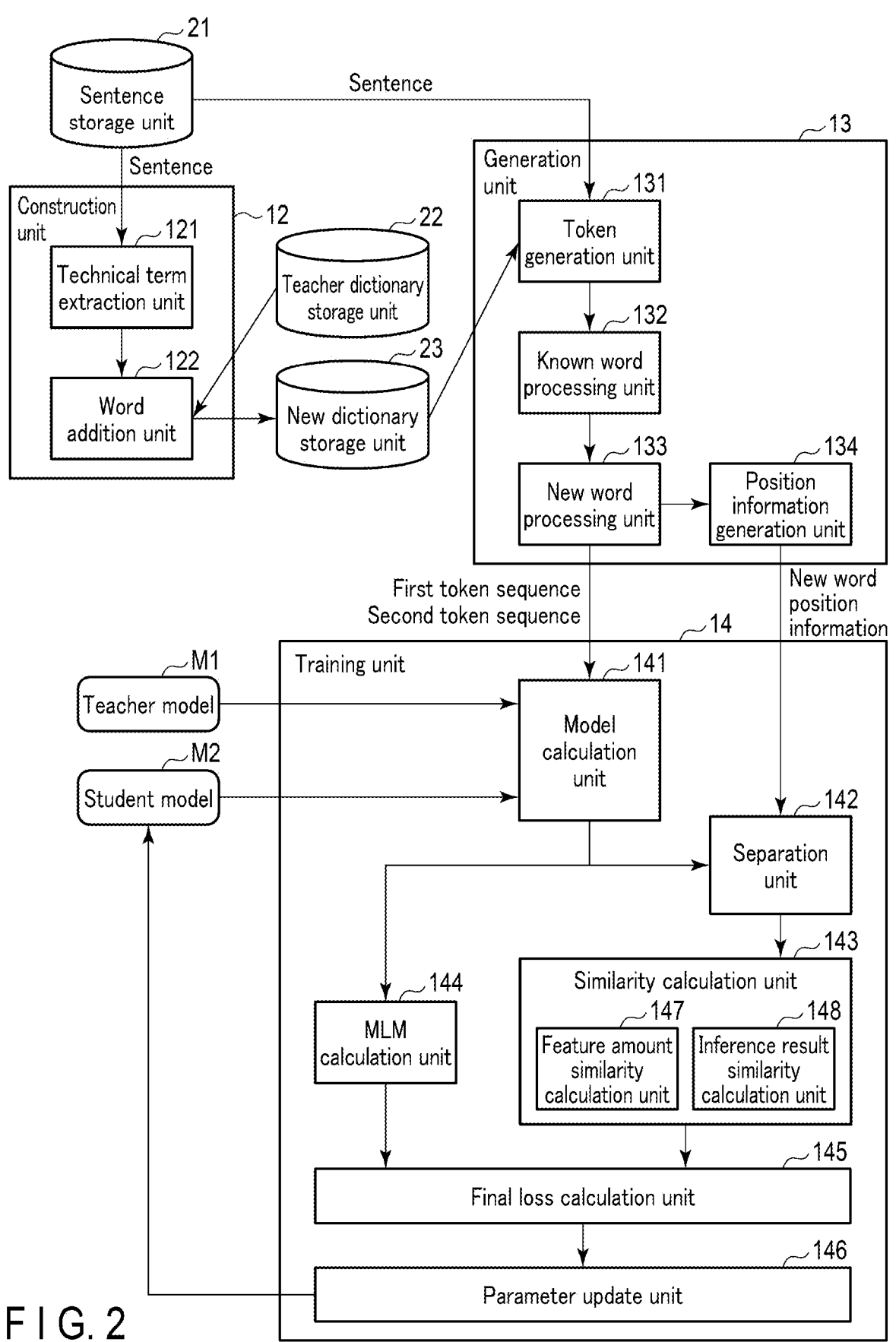
F I G. 2

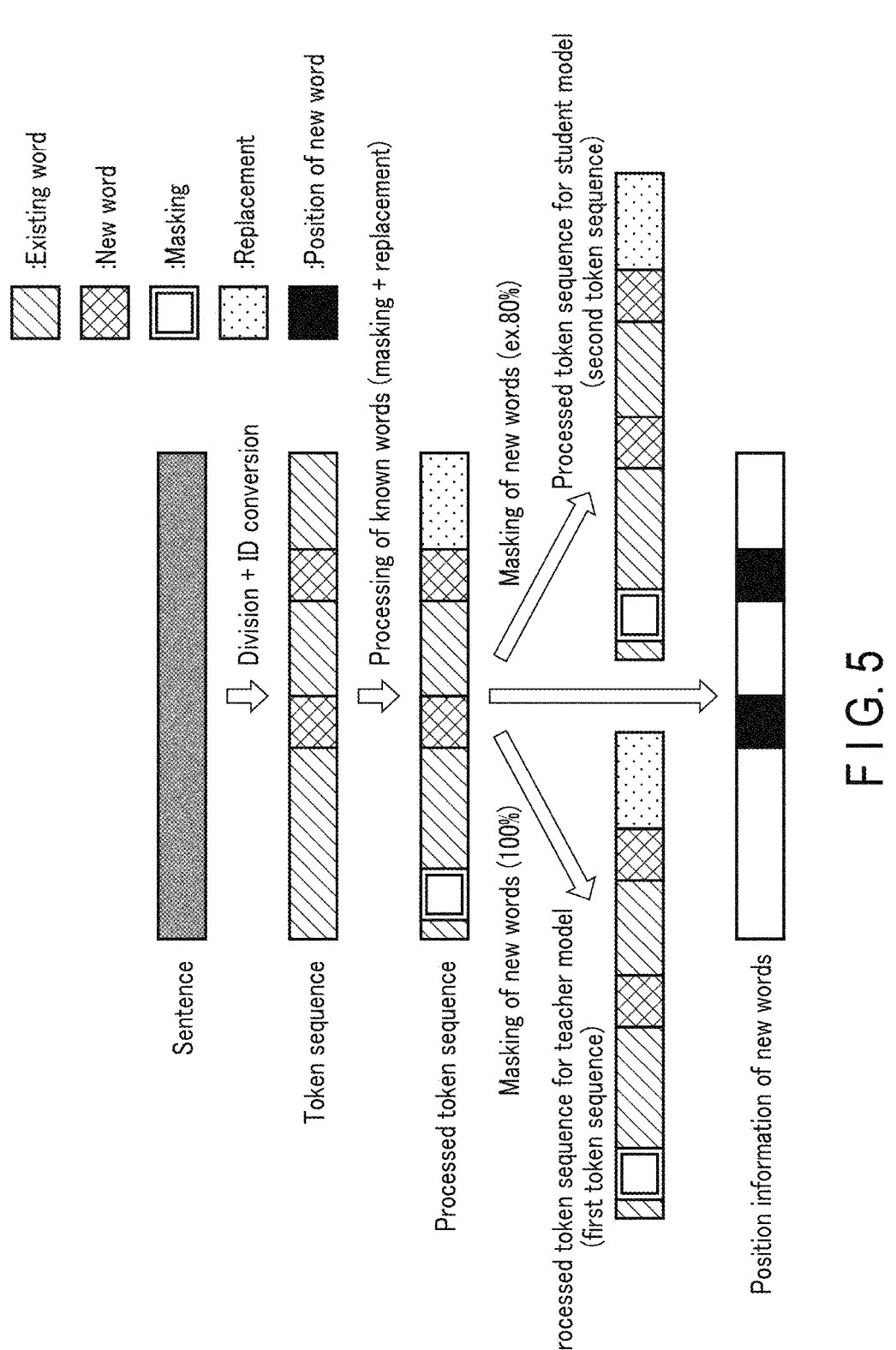
F I G. 5

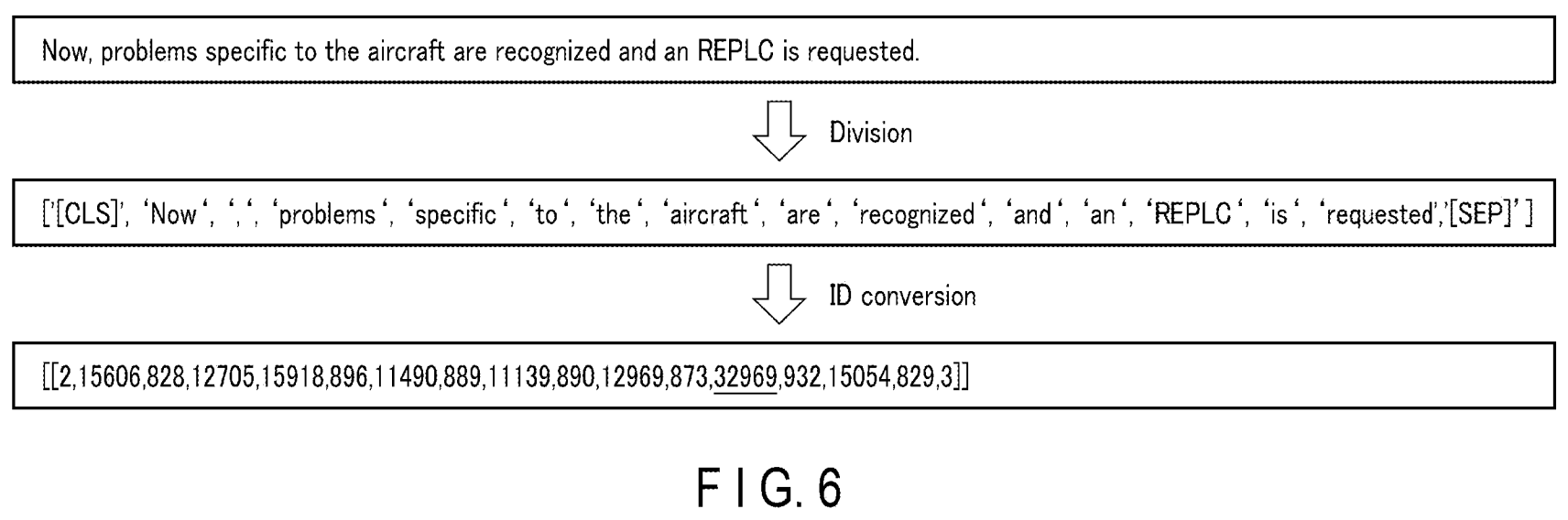

Now, problems specific to the aircraft are recognized and an REPLC is requested.

⇨ Division

[['[CLS]', 'Now', ',', ',', 'problems', 'specific', ',' 'to', 'the', 'aircraft', 'are', 'recognized', 'and', ',' 'an', 'REPLC', ',' 'is', ',' 'requested', '[SEP]']]

⇨ ID conversion

[[2,15606,828,12705,15918,896,11490,889,11139,890,12969,873,32969,932,15054,829,3]]

F I G. 6

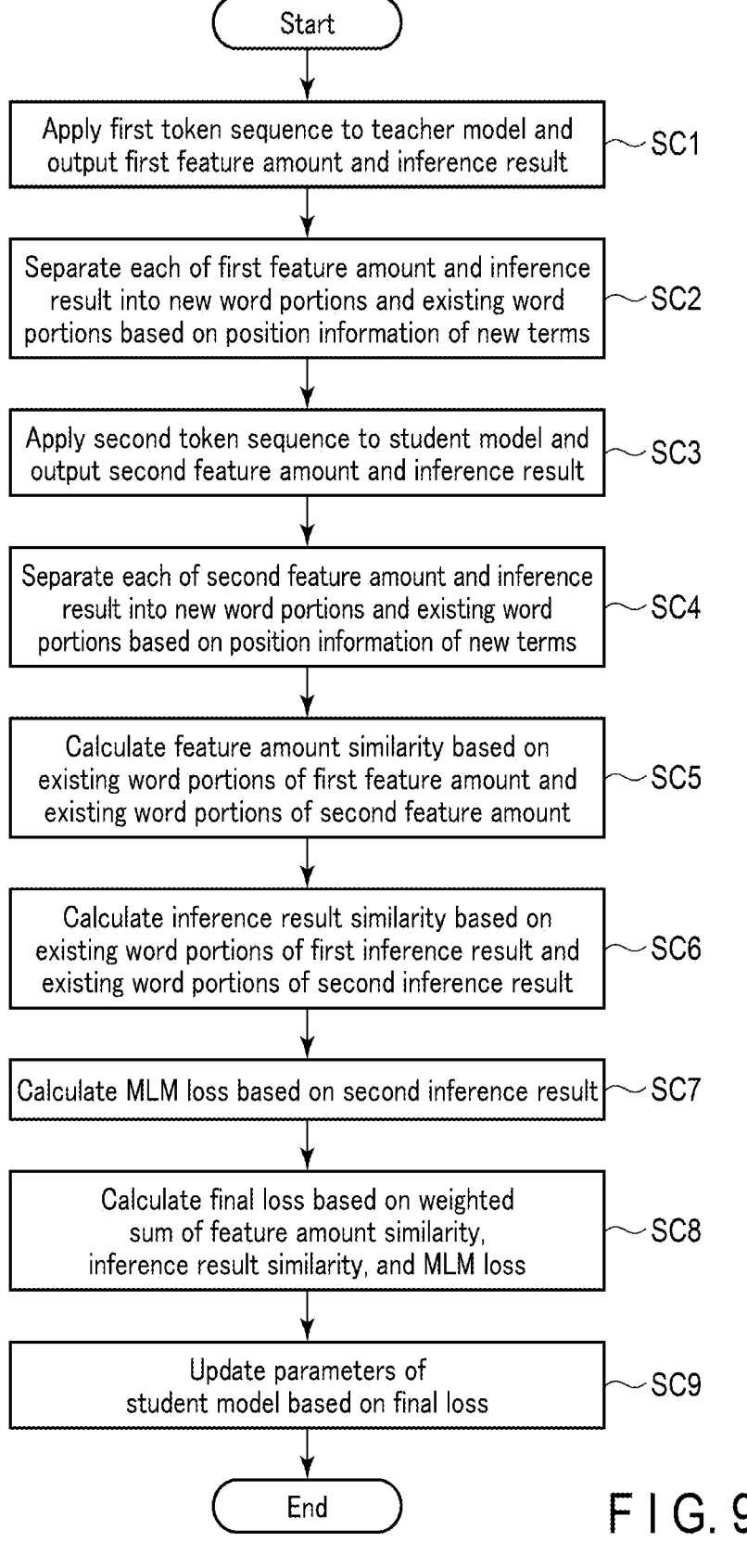

Start

Apply first token sequence to teacher model and output first feature amount and inference result —SC1

Separate each of first feature amount and inference result into new word portions and existing word portions based on position information of new terms —SC2

Apply second token sequence to student model and output second feature amount and inference result —SC3

Separate each of second feature amount and inference result into new word portions and existing word portions based on position information of new terms —SC4

Calculate feature amount similarity based on existing word portions of first feature amount and existing word portions of second feature amount —SC5

Calculate inference result similarity based on existing word portions of first inference result and existing word portions of second inference result —SC6

Calculate MLM loss based on second inference result —SC7

Calculate final loss based on weighted sum of feature amount similarity, inference result similarity, and MLM loss —SC8

Update parameters of student model based on final loss —SC9

End

F I G. 9

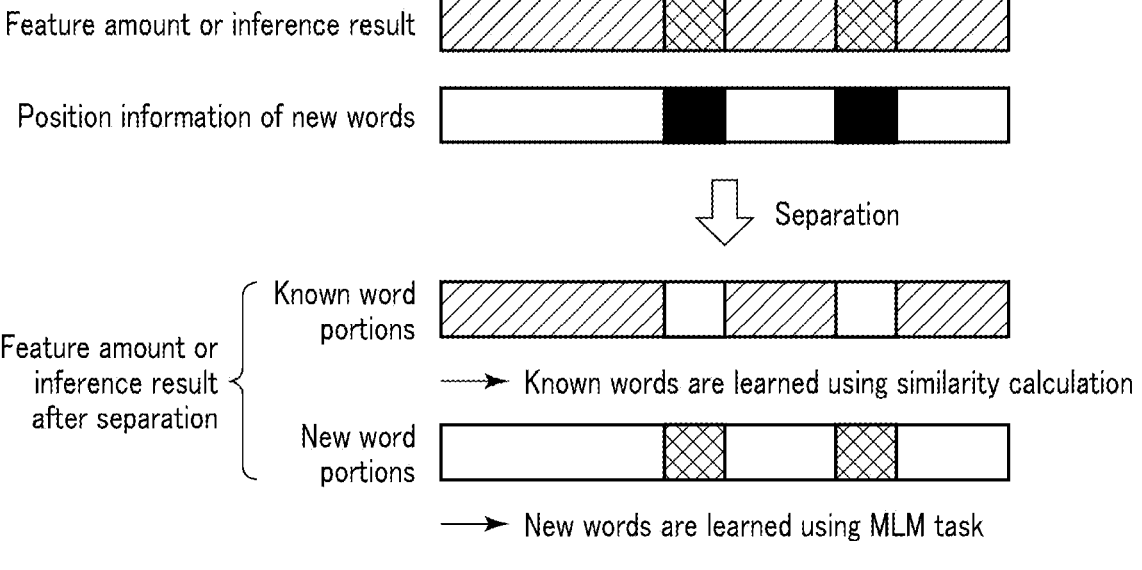
F I G. 10

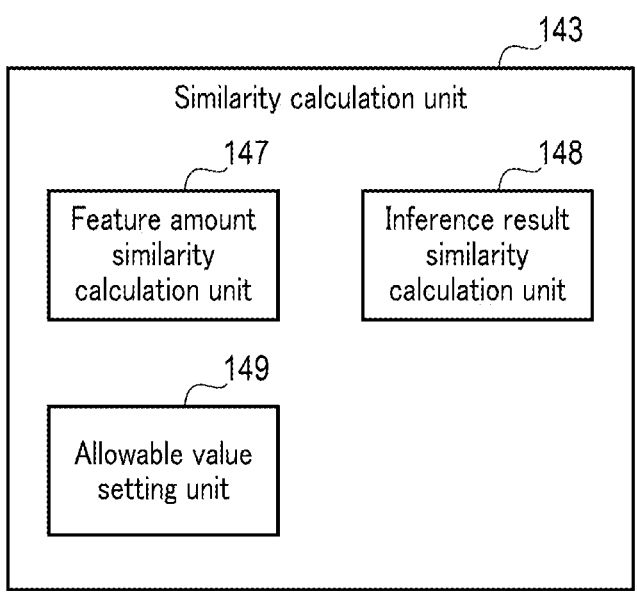
F I G. 11
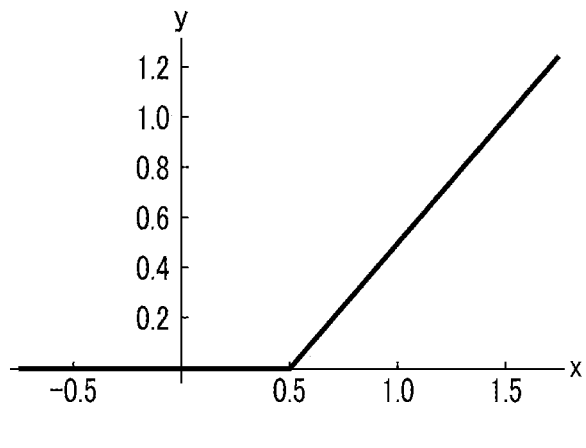
y=Max((x−t),0),t=0.5
F I G. 12

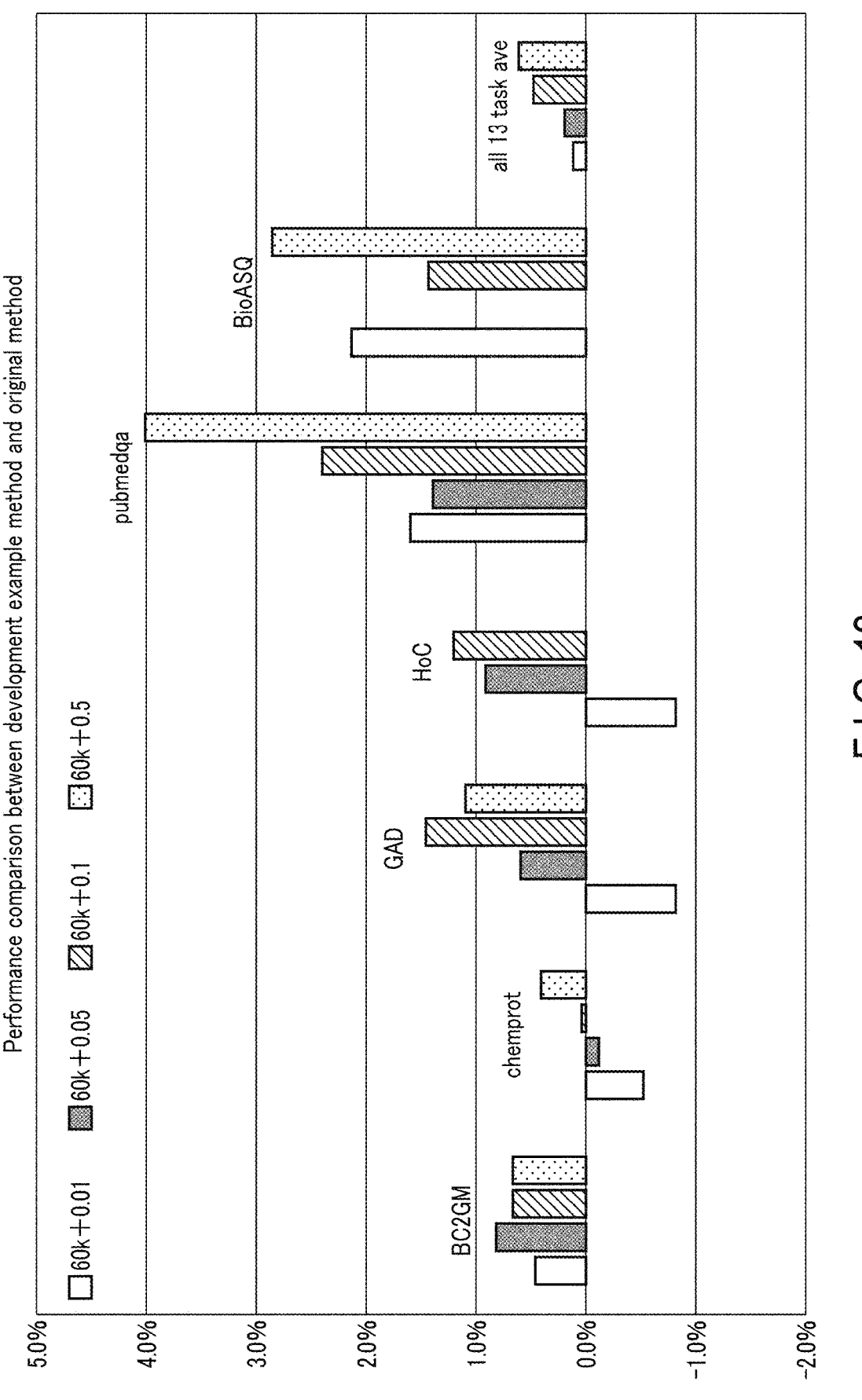
F I G. 13

LANGUAGE MODEL TRAINING APPARATUS, LANGUAGE MODEL TRAINING METHOD, AND STORAGE MEDIUM

CROSS-REFERENCE TO RELATED APPLICATION

This application is a Continuation-in-Part application of U.S. patent application Ser. No. 18/458,506, filed Aug. 30, 2023 and based upon and claiming the benefit of priority from Japanese Patent Applications No. 2023-003209, filed Jan. 12, 2023; and No. 2023-203831, filed Dec. 1, 2023, the entire contents of all of which are incorporated herein by reference.

FIELD

Embodiments described herein relate generally to a language model training apparatus, method, and a storage medium

BACKGROUND

In various fields of finance, infrastructure, law, and the like, a large number of technical terms that are not included in general documents are included. In a case where a language model trained using general documents is applied to those fields, technical terms are often treated as unknown words or divided into combinations of known short words.

In order to handle unknown words and technical terms, the vocabulary needs to be increased. In the conventional method, a language model is trained using a large-scale corpus by an embedding matrix as a basis being expanded and then completely initialized.

BRIEF DESCRIPTION OF DRAWINGS

FIG. 1 is a diagram illustrating a configuration example of a language model training apparatus.

FIG. 2 is a diagram illustrating an overall image of language model training processing.

FIG. 5 is a diagram schematically illustrating token sequence generation processing.

FIG. 6 is a diagram illustrating a specific example of processing related to step SB1.

FIG. 9 is a diagram illustrating a processing procedure of student model training processing by a training unit.

FIG. 10 is a diagram schematically illustrating separation processing according to step SC2.

FIG. 11 is a diagram illustrating a configuration example of a similarity calculation unit according to a development example.

FIG. 12 is a diagram illustrating a graph of a similarity loss according to the development example.

FIG. 13 is a diagram illustrating a graph of a performance comparison between a method of the development example and an original method.

DETAILED DESCRIPTION

Figures 3, 4:
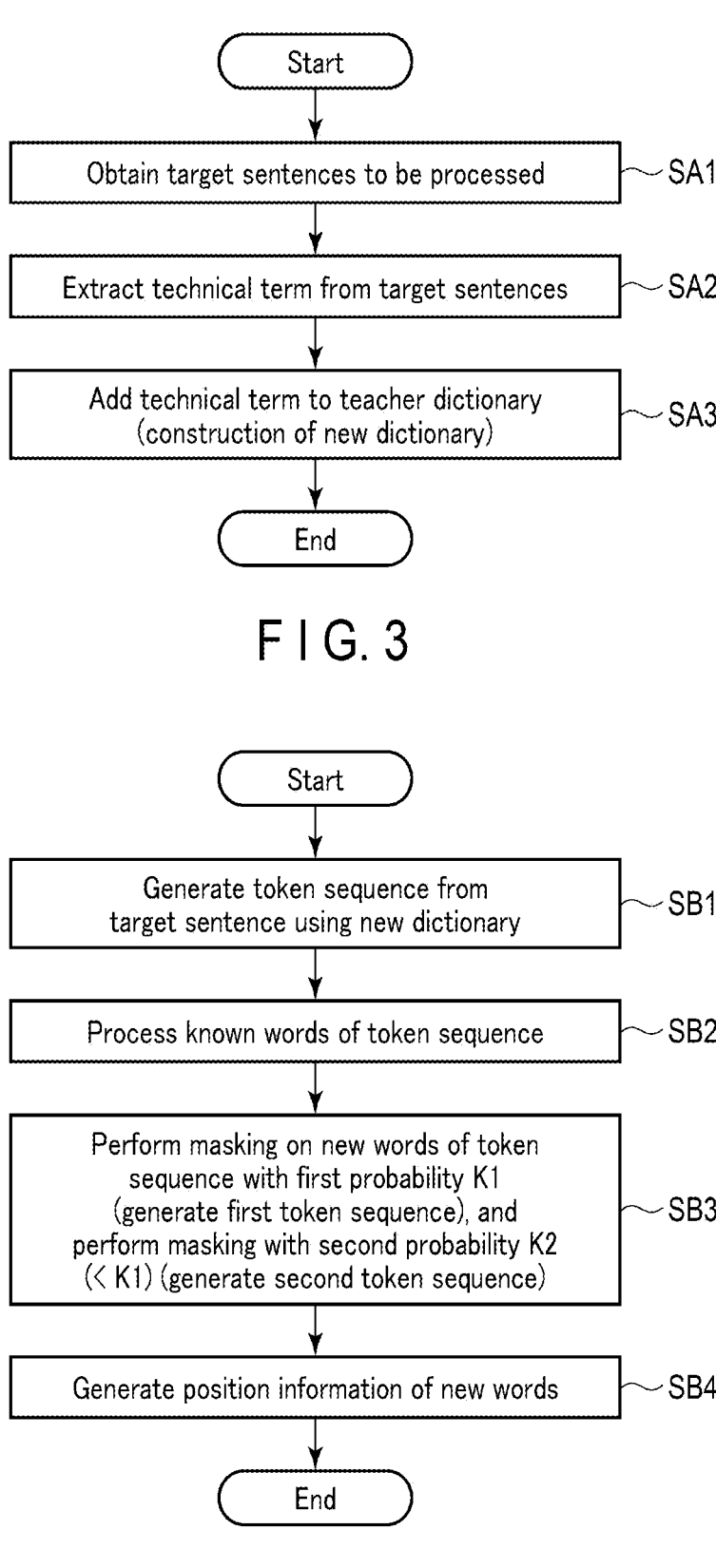
FIG. 3 is a diagram illustrating a processing procedure of new dictionary construction processing by a construction unit.
FIG. 4 is a diagram illustrating a processing procedure of token sequence generation processing by a generation unit.

A language model training apparatus according to an embodiment includes an obtainment unit, a generation unit, and a training unit. The obtainment unit obtains a target sentence including a sequence of words that are known words or new words. The generation unit generates position information of a new word included in the target sentence and a token sequence that is a sequence of identifiers of words included in the target sentence. The token sequence includes a first token sequence for a teacher model among language models and a second token sequence for a student model among the language models. The first token sequence and the second token sequence are different in at least some of processed words. The training unit updates parameters of the student model utilizing knowledge distillation from the teacher model to the student model based on the position information of the new word, the first token sequence, and the second token sequence.

Hereinafter, a language model training apparatus, method, and a program according to the present embodiment will be described with reference to the drawings.

FIG. 1 is a diagram illustrating a configuration example of a language model training apparatus 100 according to the present embodiment. As illustrated in FIG. 1, the language model training apparatus 100 is a computer including a processing circuitry 1, a storage apparatus 2, an input device 3, a communication device 4, and a display device 5. Data communication among the processing circuitry 1, the storage apparatus 2, the input device 3, the communication device 4, and the display device 5 is performed via a bus. The language model training apparatus 100 trains a language model.

The processing circuitry 1 includes a processor such as a central processing unit (CPU) and a memory such as a random access memory (RAM). The processing circuitry 1 includes an obtainment unit 11, a construction unit 12, a generation unit 13, a training unit 14, and a display control unit 15. The processing circuitry 1 implements functions of the respective units 11 to 15 by executing a language model training program. The language model training program is stored in a non-transitory computer-readable storage medium such as the storage apparatus 2. The language model training program may be implemented as a single program that describes all the functions of the respective units 11 to 15, or may be implemented as a plurality of modules divided into several functional units. Furthermore, the units 11 to 15 may be implemented by an integrated circuit such as an application specific integrated circuit (ASIC). In this case, they may be implemented in a single integrated circuit or may be individually implemented in a plurality of integrated circuits.

The obtainment unit 11 obtains a sentence to be processed (hereinafter, target sentence). The sentence means a sentence, that is, a sequence of various words. The words are classified into known words and new words. The known words are words registered in a dictionary to be referred to, and the new words mean words not registered in the dictionary to be referred to. Note that the present embodiment can be applied to any language such as Japanese, English, Chinese, Spanish, Portuguese, German, French, Russian, Arabic, or Korean.

The dictionary according to the present embodiment includes an embedding matrix in which words and identifiers (IDs) corresponding to the words are associated with each other. The embedding matrix has a dimension corresponding to the number of the registered words. In the dictionary, vectors that convert (embed) the words into vectors in a vector space formed by the embedding matrix corresponds to the identifiers. The embedding matrix is generated by a method such as a neural network, dimension reduction, or a probability model. Note that the dictionary may include a table or a database in which the words and the identifiers are associated with each other.

The dictionary according to the present embodiment includes a teacher dictionary and a new dictionary. The teacher dictionary means a dictionary of words included in sentences used for training a teacher model among language models. The new dictionary means a dictionary of words configured to be used for training a student model among the language models. The language models are machine learning models that perform a language processing task. As the language processing task, for example, sentence generation, a filling problem, next sentence prediction, machine translation, a question response, and the like can be applied, but the language processing task is not particularly limited thereto. The teacher model means an already trained language model. The student model means a language model to be generated. The student model is generated by knowledge distillation from the teacher model. Typically, the student model is lighter than the teacher model. Here, being light means that the number of parameters of a weight, a bias, and the like is small, the number of intermediate layers is small, or the like.

The construction unit 12 extracts technical terms from a target sentence, and constructs a new dictionary by adding a new word that does not exist in the teacher dictionary among the extracted technical terms to the teacher dictionary.

The generation unit 13 generates position information of a new word included in a target sentence obtained by the obtainment unit 11 and a token sequence that is a sequence of identifiers of words included in the target sentence. Specifically, the generation unit 13 generates a token sequence by dividing the target sentence into words using the new dictionary and converting each of the words into an identifier. The token sequence includes a first token sequence for a teacher model among language models and a second token sequence for a student model among the language models. The first token sequence and the second token sequence are different in at least some of processed words. The generation unit 13 generates a first token sequence by masking a new word that does not exist in the teacher dictionary with a first probability, and generates a second token sequence by masking the new word with a second probability lower than the first probability.

The training unit 14 updates parameters of the student model utilizing knowledge distillation from the teacher model to the student model based on the position information of the new word, the first token sequence, the second token sequence generated by the generation unit 13. Specifically, the training unit 14 applies the first token sequence to the teacher model and calculates a first feature amount and a first inference result, and applies the second token sequence to the student model and calculates a second feature amount and a second inference result. Then, the training unit 14 updates the parameters of the student model based on the position information of the new word, the first feature amount, the first inference result, the second feature amount, and the second inference result. Here, the training unit 14 updates the parameters of the student model using a final loss that is a weighted sum of a similarity loss and a masked language model (MLM) loss. The similarity loss represents a similarity between the first feature amount and the first inference result from the teacher model and the second feature amount and the second inference result from the student model. More specifically, the similarity loss includes a weighted sum of a first similarity and a second similarity. The first similarity represents a similarity between the first feature amount from the teacher model and the second feature amount from the student model. The second similarity represents a similarity between the first inference result from the teacher model and the second inference result from the student model. The MLM loss represents a cross entropy of the second inference result from the student model and a correct label. A first weight with respect to the similarity loss and a second weight with respect to the MLM loss are adjustable.

The display control unit 15 displays various types of information on the display device 5. As an example, the display control unit 15 displays a target sentence, an inference result, and the like.

The storage apparatus 2 includes a read only memory (ROM), a hard disk drive (HDD), a solid state drive (SSD), an integrated circuit storage apparatus, and the like. The storage apparatus 2 stores the language model training program and the like. Furthermore, the storage apparatus 2 stores the teacher dictionary, the new dictionary, the teacher model, and the student model.

The input device 3 inputs various commands from a user. As the input device 3, a keyboard, a mouse, various switches, a touch pad, a touch panel display, or the like can be used. An output signal from the input device 3 is supplied to the processing circuitry 1. Note that the input device 3 may be an input device of a computer connected to the processing circuitry 1 in a wired or wireless manner.

The communication device 4 is an interface for performing data communication with an external device connected to the language model training apparatus 100 via a network.

The display device 5 displays various types of information. As the display device 5, a cathode-ray tube (CRT) display, a liquid crystal display, an organic electro luminescence (EL) display, a light-emitting diode (LED) display, a plasma display, or any other display known in the art can be appropriately used. Furthermore, the display device 5 may be a projector.

Hereinafter, an operation example of the language model training apparatus 100 according to the present embodiment will be described.

FIG. 2 is a diagram illustrating an overall image of language model training processing by the language model training apparatus 100. As illustrated in FIG. 2, the language model training apparatus 100 includes a sentence storage unit 21, a teacher dictionary storage unit 22, and a new dictionary storage unit 23. As an example, the sentence storage unit 21, the teacher dictionary storage unit 22, and the new dictionary storage unit 23 are storage areas allocated to the storage apparatus 2. Here, new dictionary construction processing by the construction unit 12 will be described with reference to FIGS. 2 and 3. Note that, as an example, the language model according to the present embodiment predicts a token sequence that is a sequence of identifiers of words before being processed with a predetermined probability from a token sequence that is a sequence of identifiers of words after being processed with the predetermined probability.

FIG. 3 is a diagram illustrating a processing procedure of the new dictionary construction processing by the construction unit 12. The construction unit 12 constructs a new dictionary based on target sentences stored in the sentence storage unit 21 and the teacher dictionary. Specifically, the construction unit 12 includes a technical term extraction unit 121 and a word addition unit 122.

As illustrated in FIGS. 2 and 3, the technical term extraction unit 121 obtains sentences to be processed (target sentences) from the sentence storage unit 21 (step SA1). The sentence storage unit 21 stores a plurality of sentences. In step SA1, a plurality of target sentences is obtained from the sentence storage unit 21. The following steps SA2 and SA3 are performed for each of the target sentences.

In a case where step SA1 is performed, the technical term extraction unit 121 extracts a technical term from the target sentences obtained in step SA1 (step SA2). More specifically, the technical term extraction unit 121 extracts only a technical term that appeared at a high frequency over the plurality of target sentences. The high frequency means a frequency higher than a set threshold. The set threshold can be set to any value. The "technical term" is a word other than a general term used without depending on the field, and means a word used exclusively in the field. The target sentences are sequences of words including technical terms and general terms.

In a case where step SA2 is performed, the word addition unit 122 reads the teacher dictionary from the teacher dictionary storage unit 22, adds the technical term extracted in step SA2 to the teacher dictionary as a new word, and constructs a new dictionary (step SA3). The new dictionary is used as a dictionary for the student model. The new dictionary includes all words registered in the teacher dictionary and the word added in step SA3. As an example, in a case where the number of words registered in the teacher dictionary is 30,000 and the number of words added in step SA3 is 2,000, the number of words registered in the new dictionary is 32,000. By only a technical term that appears at a higher frequency than the set threshold being added to the new dictionary, addition of errors, omissions, and the like can be reduced. As a result, accuracy of the new dictionary is expected to be improved.

As described above, the new dictionary construction processing by the construction unit 12 ends.

Next, token sequence generation processing by the generation unit 13 will be described with reference to FIGS. 2, 4, and 5. FIG. 4 is a diagram illustrating a processing procedure of the token sequence generation processing by the generation unit 13. FIG. 5 is a diagram schematically illustrating the token sequence generation processing.

The generation unit 13 generates a first token sequence for a teacher model M1 and a second token sequence for a student model M2 based on the new dictionary and a target sentence. Specifically, the generation unit 13 includes a token generation unit 131, a known word processing unit 132, a new word processing unit 133, and a position information generation unit 134.

As illustrated in FIGS. 2, 4, and 5, the token generation unit 131 reads a target sentence from the sentence storage unit 21, and generates a token sequence from the read target sentence using the new dictionary constructed in step SA3 (step SB1). As described above, the target sentence is a sequence of words including technical terms and general terms. From another point of view, the target sentence is a sequence of words including new words and known words. The new words mean words that are not registered in the teacher dictionary. The known words mean words that are registered in the teacher dictionary. Even a technical term may be classified into a new word or may be classified into a known word. General terms are classified into known words.

Details of processing related to step SB1 will be described. First, the token generation unit 131 divides a target sentence into tokens using the new dictionary. The tokens mean units of processing, and are set to words, characters, sub-words, or the like. In the following description, the tokens are set to words. Note that not only words as characters or character strings but also identifiers equivalent to the words may be expressed as words in the "words" as tokens. Next, the token generation unit 131 replaces each of the words (characters or character strings) with an identifier using the new dictionary. As a result, a token sequence that is a sequence of the identifiers of the words is generated.

FIG. 6 is a diagram illustrating a specific example of the processing related to step SB1. A target sentence illustrated in FIG. 6 is assumed to be 'Now, problems specific to the aircraft are recognized and an REPLC is requested.'. The underlined word "REPLC" in FIG. 6 means a technical term representing "replacement". First, the target sentence is divided into a sequence of words "[CLS]', 'Now', ',', 'problems', 'specific', 'to', 'the', 'aircraft', 'are', 'recognized', 'and', 'an', 'REPLC', 'is', 'requested', '.' '[SEP]'". The target sentence is divided for each of the words registered in the new dictionary. [CLS] is a token meaning a beginning of a sentence, and [SEP] is a token meaning a sentence break.

Next, the sequence of the words is converted into a sequence of identifiers "2', '15606', '828', '12705', '15918', '896', '11490', '889', '11139', '890', '12969', '873', '32969', '932', '15054', '829', '3'". The sequence of the identifiers is generated by converting each of the words included in the sequence of the words into an identifier utilizing the new dictionary. In the present embodiment, since a new word included in a processed sentence is registered in the new dictionary in advance, the new word can be converted into an identifier. As a result, a token sequence is generated.

As illustrated in FIGS. 2, 4, and 5, in a case where step SB1 is performed, the known word processing unit 132 processes known words of the token sequence generated in step SB1 (step SB2). As processing according to step SB2, masking and replacement are performed. The masking is processing of replacing a target known word with a token meaning masking. The replacement is processing of replacing a target word with a word registered in the teacher dictionary. The masking and the replacement are performed with individual probabilities. Typically, the replacement is performed with a lower probability than the masking. As an example, the masking is performed with a probability of 12% and the replacement is performed with a probability of 1.5%.

Figure 7:
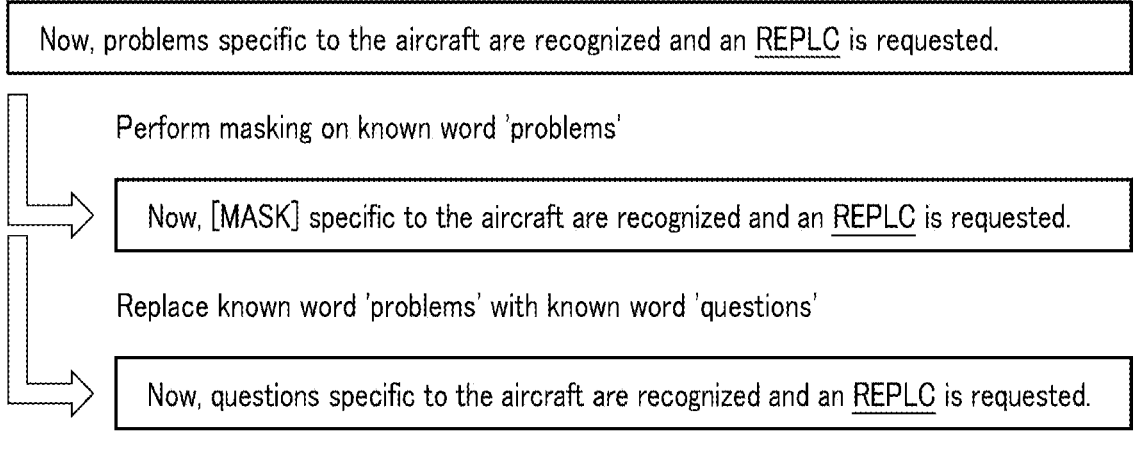
FIG. 7 is a diagram illustrating a specific example of processing related to step SB2.

FIG. 7 is a diagram illustrating a specific example of processing related to step SB2. A target sentence illustrated in FIG. 7 is assumed to be 'Now, problems specific to the aircraft are recognized and an REPLC is requested.' similarly to FIG. 6. Also in FIG. 7, the underlined word "REPLC" means a technical term representing "replacement". As an example, in a case where the masking is performed on a known word "problems", the target sentence is converted to 'Now, [MASK] specific to the aircraft are recognized and an REPLC is requested.'. As another example, in a case where the known word "problems" is replaced with a known word "questions", the target sentence is converted to 'Now, questions specific to the aircraft are recognized and an REPLC is requested.'. Note that, in FIG. 7, processing is performed on a character or a character string that is a word for easy understanding of processing, but processing may be performed on an identifier.

As illustrated in FIGS. 2, 4, and 5, in a case where step SB2 is performed, the new word processing unit 133 performs masking on new words of the token sequence processed in step SB2 or identifiers of the new words with a first probability K1 and generates a first token sequence, and performs masking with a second probability K2 (<K1) and generates a second token sequence (step SB3). As processing according to step SB3, masking is performed. As an example, the probability K1 is set to 100%. That is, all the new words included in the token sequence are subjected to masking, and the first token sequence is generated. The probability K2 is set to any numerical value less than 100%. As an example, the probability K2 is set to 90%.

The first token sequence is input to the teacher model. In other words, since the teacher model has not learned the new words, the token sequence generated in step SB1 or SB2 cannot be processed. On the other hand, the teacher model can process the first token sequence in which all the new words were subjected to masking. The second token sequence is input to the student model. Because the new words are included in the second token sequence, the student model can learn the new words. As described above, the first token sequence and the second token sequence are different at least some of the processed words.

As illustrated in FIGS. 2, 4, and 5, in a case where step SB3 is performed, the position information generation unit 134 generates position information of the new words (step SB4). As an example, the position information generation unit 134 generates the position information by assigning a label "0" to each of the words included in the token sequence in step SB1 in a case where the word is not a new word, and assigning a label "1" in a case where the word is a new word. That is, the position information is a sequence of labels indicating whether the word is a new word.

Figure 8:
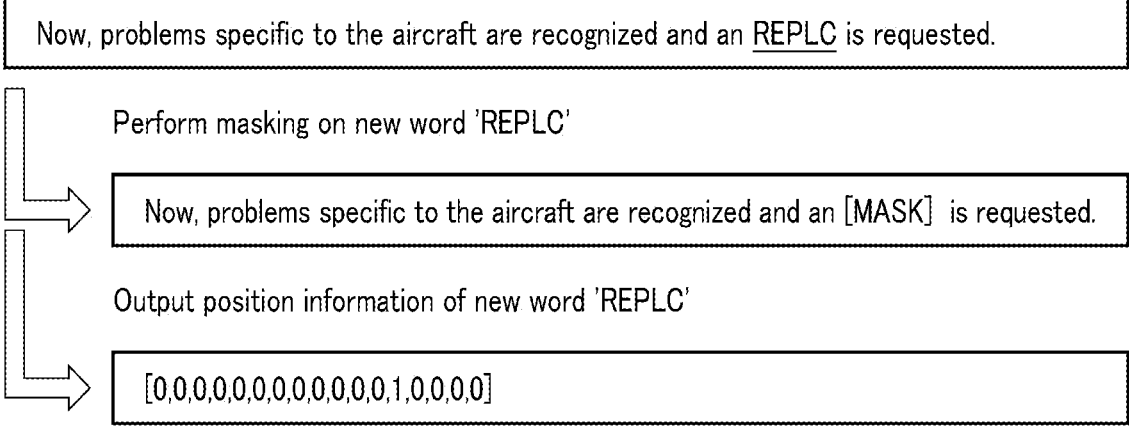
FIG. 8 is a diagram illustrating a specific example of processing related to steps SB3 and SB4.

FIG. 8 is a diagram illustrating a specific example of processing related to steps SB3 and SB4. A target sentence illustrated in FIG. 8 is assumed to be 'Now, problems specific to the aircraft are recognized and an REPLC is requested.' similarly to FIG. 6. Also in FIG. 8, the underlined word "REPLC" means a technical term representing "replacement". As an example, in a case where the masking is performed on a new word "REPLC", the target sentence is converted to 'Now, problems specific to the aircraft are recognized and an [MASK] is requested.'. Furthermore, the target sentence is converted into position information '0, 0, 0, 0, 0, 0, 0, 0, 0, 0, 0, 1, 0, 0, 0, 0,' by a label "0" being assigned to each of the words in a case where the word is not a new word, and a label "1" being assigned to each of the words in a case where the word is a new word. Note that, in FIG. 8, processing is performed on a character or a character string that is a word for easy understanding of processing, but processing may be performed on an identifier.

As described above, the token sequence generation processing by the generation unit 13 ends.

Note that the token sequence generation processing illustrated in FIG. 4 is an example, and the processing order can be freely changed. As an example, steps SB3 and SB4 may be performed in reverse order or in parallel.

Next, student model training processing by the training unit 14 will be described with reference to FIGS. 2 and 9. FIG. 9 is a diagram illustrating a processing procedure of the student model training processing by the training unit 14.

The training unit 14 trains the student model M2 utilizing knowledge distillation from the teacher model M1 based on a first token sequence, a second token sequence, and position information of a new word. More specifically, based on position information of a new word, the training unit 14 separates a portion of a first feature amount and an inference result regarding a known word and a portion of a first feature amount and an inference result regarding a new word from a first feature amount and an inference result, and separates a portion of a second feature amount and an inference result regarding a known word and a portion of a second feature amount and an inference result regarding a new word from a second feature amount and an inference result. Then, the training unit 14 calculates a final loss based on the known word portion of the first feature amount and the inference result, the new word portion of the first feature amount and the inference result, the known word portion of the second feature amount and the inference result, and the new word portion of the second feature amount and the inference result. The training unit 14 updates parameters of the student model such that the minimum loss is reduced. Specifically, the training unit 14 includes a model calculation unit 141, a separation unit 142, a similarity calculation unit 143, an MLM calculation unit 144, a final loss calculation unit 145, and a parameter update unit 146.

As illustrated in FIGS. 2 and 9, the model calculation unit 141 applies the first token sequence generated in step SB3 to the teacher model M1 and outputs a first feature amount and an inference result (step SC1). The first feature amount means a hidden state output from the final layer of hidden layers included in the teacher model M1. The first inference result is a final output from the teacher model M1, and means a sequence of identifiers of final possibilities of the respective words included in the first token sequence. The final possibilities mean words each having the highest likelihood. Specifically, the model calculation unit 141 includes a transformer and a classifier. The transformer converts the first token sequence into a first feature amount. The classifier converts the first feature amount into a first inference result. Specifically, the classifier converts the first feature amount into a plurality of likelihoods corresponding to a plurality of respective words registered in advance, selects a final possibility from the plurality of words based on the plurality of likelihoods, and outputs an identifier of the final possibility.

In a case where step SC1 is performed, the separation unit 142 separates each of the first feature amount and the inference result output in step SC1 into new word portions and existing word portions based on the position information of the new terms generated in step SB4 (step SC2).

FIG. 10 is a diagram schematically illustrating separation processing according to step SC2. As illustrated in FIG. 10, the feature amount or the inference result is separated into the known word portions and the new word portions based on the feature amount or the inference result and the position information of the new words. As an example, the known word portions are extracted by the new words in the feature amount or the inference result being filled with zero values, and the new word portions are extracted by the known word portions being filled with zero values. The known word portions are learned by knowledge distillation based on similarity calculation with the teacher model. The new word portions are learned by the MLM task.

The model calculation unit 141 applies the second token sequence generated in step SB3 to the student model M2 and outputs a second feature amount and an inference result (step SC3). The second feature amount means a hidden state of the final layer of hidden layers included in the student model M2. The second inference result is a final output from the student model M2, and means a sequence of identifiers of possibilities of the respective words included in the second token sequence. Specifically, the model calculation unit 141 includes the transformer and the classifier. The transformer converts the second token sequence into a second feature amount. The classifier converts the second feature amount into a second inference result.

In a case where step SC3 is performed, the separation unit 142 separates each of the second feature amount and the inference result output in step SC3 into new word portions and existing word portions based on the position information of the new terms generated in step SB4 (step SC4). The separation processing according to step SC4 is similar to step SC2.

In a case where step SC4 is performed, the similarity calculation unit 143 calculates a similarity loss between the first feature amount and the first inference result from the teacher model M1 and the second feature amount and the second inference result from the student model M2. The similarity loss includes a weighted sum of a first similarity and a second similarity. The first similarity represents a similarity (feature amount similarity) between the first feature amount from the teacher model and the second feature amount from the student model. The second similarity represents a similarity (inference result similarity) between the first inference result from the teacher model and the second inference result from the student model. Specifically, the similarity calculation unit 143 includes a feature amount similarity calculation unit 147 and an inference result similarity calculation unit 148.

The feature amount similarity calculation unit 147 calculates the feature amount similarity based on the existing word portions of the first feature amount and the existing word portions of the second feature amount (step SC5). As the feature amount similarity, a cosine similarity is calculated. As indicated in the following Formula (1), the cosine similarity $S_C(A, B)$ is expressed by a ratio of an inner product to an absolute value product of an existing word portion A of a first feature amount and an existing word portion B of a second feature amount.

$$S_C(A, B) := \cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}} \quad (1)$$

In a case where step SC5 is performed, the inference result similarity calculation unit 148 calculates the inference result similarity based on the existing word portions of the first inference result and the existing word portions of the second inference result (step SC6). As the inference result similarity, a KL divergence and an MSE loss are calculated. The KL divergence $D_{KL}$ means the Kullback-Leibler divergence of an existing word portion Q of a second inference result with respect to an existing word portion P of a first inference result as indicated in the following Formula (2). The MSE loss MSE means a mean square error between an existing word portion Y of a second inference result and an existing word portion $Y^\wedge$ of a first inference result as indicated in the following Formula (3).

$$D_{KL}(P\|Q) = \sum_i P(i) \log \frac{P(i)}{Q(i)} \quad (2)$$

$$MSE = \frac{1}{n} \sum_{i=1}^{n} (Y_i - \hat{Y}_i)^2 \quad (3)$$

In a case where step SC6 is performed, the MLM calculation unit 144 calculates the MLM loss based on the second inference result output in step SC3 (step SC7). The MLM calculation unit 144 performs calculation by inference results of words that were subjected to masking using the second inference result that is the final output of the student model. The words that were subjected to masking are known words that were randomly subjected to masking and new words that were subjected to masking with the probability K. From a task of inferring them, the student model learns knowledge focusing on the new words. The MLM loss is expressed by a cross entropy H(p, q) of a second inference result q with respect to a correct label q of each of the words as indicated in the following Formula (4).

$$H(p, q) = -\sum_x p(x) \log q(x) \quad (4)$$

In a case where step SC7 is performed, the final loss calculation unit 145 calculates a final loss based on a weighted sum of the feature amount similarity calculated in step SC5, the inference result similarity calculated in step SC6, and the MLM loss calculated in step SC7 (step SC8). More specifically, the final loss $L_T$ is obtained by the weighted sum of the cosine similarity Sc, the KL divergence $D_{KL}$, the MSE loss MSE, and the MLM loss H as indicated in the following Formula (5). By using the cosine similarity, the student model can learn knowledge such as a context regarding a known word while matching the feature amount of the student model with the feature amount of the teacher model as much as possible. By using the KL divergence and the MSE loss, the student model can learn knowledge such as a context regarding a known word while matching the inference result of the student model with the inference result of the teacher model as much as possible. By using the MLM loss, the student model can learn knowledge of a new word.

$$L_T = w_1 S_C + w_2 D_{KL} + w_3 MSE + w_4 H \quad (5)$$

As the value of the weight $w_1$ with respect to the cosine similarity Sc is larger, learning focusing on an existing word is performed. As the value of the weight $w_2$ with respect to the KL divergence $D_{KL}$ is larger, learning focusing on an inference result of an existing word is performed. As the value of the weight $w_3$ with respect to the MSE loss MSE is larger, learning focusing on an inference result of an existing word is performed. As the value of the weight $w_4$ with respect to the MLM loss H is larger, learning focusing on a new word is performed. The weight $w_1$ with respect to the cosine similarity Sc, the weight $w_2$ with respect to the KL divergence $D_{KL}$, the weight $w_3$ with respect to the MSE loss MSE, and the weight $w_4$ with respect to the MLM loss H can be freely set. The balance of learning can be adjusted by the ratio of each of the weights $w_1$ to $w_4$ being adjusted. As an example, by the weight $w_1=2$, the weight $w_2=1$, the weight $w_3=0.2$, the weight $w_4=1$, or the like being set, learning in which each loss is uniformly considered can be performed.

In a case where step SC8 is performed, the parameter update unit 146 updates parameters of the student model M2 based on the final loss calculated in step SC8 (step SC9). In step SC9, the parameter update unit 146 updates the parameters of the student model M2 such that the final loss is reduced. The optimization function and the optimization parameter can be freely set. As an example, AdamW can be set as the optimization function, and the number of times of learning, the learning rate, or the like can be set as the optimization parameter.

Steps SB1 to SB4 and SC1 to SC9 are repeated while target sentences are changed until a stop condition is satisfied. As an example, the stop condition can be freely set, such as that the predetermined number of epochs was reached, that the evaluation index value of the inference result reached the acceptance criterion, or the like. In step SB3, the value of the probability K2 is freely changed within a range of less than 100% for each of the target sentences.

As described above, the student model training processing by training processing by the training unit 14 ends.

Steps SC1 and SC2 and steps SC3 and SC4 may be performed in reverse order or in parallel. Furthermore, the processing order of steps SC5, SC6, and SC7 may be appropriately changed, or may be executed in parallel.

Development Example

FIG. 11 is a diagram illustrating a configuration example of a similarity calculation unit 143 according to a development example. As illustrated in FIG. 11, the similarity calculation unit 143 according to the development example includes an allowable value setting unit 149 in addition to the feature amount similarity calculation unit 147 and the inference result similarity calculation unit 148. The allowable value setting unit 149 calculates a final value of a similarity loss based on a value of a similarity loss (hereinafter, referred to as an "intermediate value") and a preset allowable value. The allowable value can be set to any number by a user, etc. The intermediate value is defined by the sum of the feature amount similarity calculated by the feature amount similarity calculation unit 147 and the inference result similarity calculated by the inference result similarity calculation unit 148.

Specifically, in a case where the intermediate value of the similarity loss (Loss_similarity) is less than an allowable value (t), the allowable value setting unit 149 sets the final value of the similarity loss (Loss_similarity_new) to 0, as indicated in the following Formula (6). In a case where the intermediate value of the similarity loss (Loss_similarity) is equal to or greater than the allowable value (t), the allowable value setting unit 149 sets the final value of the similarity loss (Loss_similarity_new) to a value obtained by subtracting the allowable value (t) from the intermediate value (Loss_similarity).

$$\text{Loss\_similarity\_new} = \text{Max}\left((\text{Loss\_similarity} - t), 0\right) \quad (6)$$

$$\text{Loss\_similarity\_new} = 0 \quad \text{if :Loss\_similarity} < t$$

$$= \text{Loss\_similarity} - t \quad \text{if :Loss\_similarity} \geq t$$

FIG. 12 is a diagram illustrating a graph of a similarity loss. The vertical axis is defined by the final value y=Loss_similarity_new, and the horizontal axis is defined by the intermediate value x=Loss_similarity. That is, the final value y is expressed as y=Max ((x−t), 0). Note that the allowable value t is set to 0.5. As illustrated in FIG. 12, in a case where the intermediate value x is less than the allowable value t, the final value y is set to 0 regardless of the value of the intermediate value x. In other words, in a case where the intermediate value x is less than the allowable value t, the similarity loss is excluded from the calculation of the final loss. In a case where the intermediate value x is equal to or greater than the allowable value t, the final value y is set to x−t. In other words, in a case where the intermediate value x is equal to or greater than the allowable value t, the similarity loss is considered in the calculation of the final loss.

As described above, the similarity loss is defined by the sum of the feature amount similarity and the inference result similarity. Specifically, the feature similarity is cosine similarity, and the inference result similarity is defined by the sum of the KL divergence and the MSE loss. Each of the cosine similarity, the KL divergence, and the MSE loss is designed based on the intermediate value and the allowance value in accordance with the Formula (6). Different allowable values may be set for the KL divergence and the MSE loss, respectively, or the same allowable value may be set for them.

FIG. 13 is a diagram illustrating a graph of a performance comparison between a method of the development example and an original method. The method of the development example is a method using the similarity loss in accordance with the Formula (6), and the original method is a method using the intermediate value directly as the final value. Supposing that the same allowable value is set for each of the cosine similarity, the KL divergence, and the MSE loss. In FIG. 13, the vertical axis represents the ratio of the performance value of the language model according to the method of the development example to the performance value of the language model according to the original method. The outlined bar corresponds to the allowable value=0.01, the gray bar corresponds to the allowable value=0.05, the hatched line bar corresponds to the allowable value=0.1, and the dot pattern bar corresponds to the allowable value=0.5. "BC2GM", "chemprot", "GAD", "HOC", "pubmedqa", and "BioASQ" are types of a corpus used in training of the language model. "all13task" represents the average values of 13 types of sub-tasks. It is understood that with each of the allowable values, the average performance values according to the method of the development example are superior to those of the original method. More specifically, it is understood that as the allowable value increases from 0.01 to 0.5, the average performance values according to the method of the development example are superior to those of the original method. It is understood that especially with the allowable value=0.1 and 0.5, in each of the corpuses, the performance values according to the method of the development example are superior to those of the original method.

As described above, the language model training apparatus 100 according to the present embodiment includes the obtainment unit 11, the generation unit 13, and the training unit 14. The obtainment unit 11 obtains a target sentence including a sequence of words that are known words or new words. The generation unit 13 generates position information of a new word included in a target sentence and a token sequence that is a sequence of identifiers of words included in the target sentence. The token sequence includes a first token sequence for a teacher model among language models and a second token sequence for a student model among the language models. The first token sequence and the second token sequence are different in at least some of processed words. The training unit 14 updates parameters of the student model utilizing knowledge distillation from the teacher model to the student model based on the position information of the new word, the first token sequence, and the second token sequence.

According to the above configuration, in a case where the parameters of the student model are updated utilizing knowledge distillation from the teacher model to the student model, processed words of the first token sequence input to the teacher model and the second token sequence input to the student model are made different, so that learning accuracy and/or efficiency of knowledge of the words in the student model can be improved. By new words being made different, accuracy and/or efficiency of learning of knowledge of the new words can be improved. By the ratio (for example, masking ratio) of processing of words in the first token sequence and the second token sequence being controlled, the knowledge learning strength of the words by the student model can be controlled.

According to another aspect, the language model training apparatus 100 according to the present embodiment further includes the teacher dictionary storage unit 22, the new dictionary storage unit 23, and the construction unit 12. The new dictionary storage unit 23 stores a new dictionary that is a dictionary of words configured to be used for training the student model. The generation unit 13 generates a token sequence by dividing a target sentence into words using the new dictionary and converting the words into identifiers. The teacher dictionary storage unit 22 stores a teacher dictionary that is a dictionary of words included in sentences used for training the teacher model. The construction unit 12 extracts technical terms from a target sentence, and constructs a new dictionary by adding a new word that does not exist in the teacher dictionary among the extracted technical terms to the teacher dictionary.

According to the above configuration, a technical term or the like can be smoothly added to a dictionary by knowledge of general terms being inherited from the teacher model by knowledge distillation instead of learning being performed from scratch, and at the same time, learning of knowledge of a new word such as a technical term being performed. As a result, the student model can be easily constructed. Furthermore, by the number of layers of the student model being freely set in knowledge distillation, a technical term can be added to a dictionary, and at the same time, a model can be constructed even using a small training corpus. Furthermore, the amount of calculation by adjustment of a model structure can be reduced.

Thus, according to the present embodiment, a language model having high inference accuracy can be easily generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A language model training apparatus comprising a processing circuitry that obtains a target sentence including a sequence of a word that is a known word or a new word, generates position information of a new word included in the target sentence and a token sequence that is a sequence of an identifier of the word included in the target sentence, wherein the token sequence includes a first token sequence for a teacher model among a language model and a second token sequence for a student model among the language model, and the first token sequence and the second token sequence are different in at least some of a processed word, and updates a parameter of the student model utilizing knowledge distillation from the teacher model to the student model based on the position information, the first token sequence, and the second token sequence, wherein the processing circuitry generates the first token sequence by masking the new word with a first probability, and generates the second token sequence by masking the new word with a second probability lower than the first probability.

2. The language model training apparatus according to claim 1, further comprising a new dictionary storage apparatus that stores a new dictionary that is a dictionary of a word configured to be used for training the student model, wherein the processing circuitry generates the token sequence by dividing the target sentence into a word using the new dictionary and converting the word into an identifier.

3. The language model training apparatus according to claim 2, further comprising a teacher dictionary storage apparatus that stores a teacher dictionary that is a dictionary of a word included in a sentence used for training the teacher model, wherein the processing circuitry extracts a technical term from the target sentence and constructs the new dictionary by adding a new word that does not exist in the teacher dictionary among the extracted technical term to the teacher dictionary.

4. The language model training apparatus according to claim 3, wherein the processing circuitry generates the first token sequence by masking a new word that does not exist in the teacher dictionary with a first probability, and generates the second token sequence by masking the new word with a second probability lower than the first probability.

5. The language model training apparatus according to claim 4, wherein the first probability is 100%, and the second probability is less than 100%.

6. The language model training apparatus according to claim 3, wherein the processing circuitry extracts only a new word that appears at a frequency higher than a threshold from the target sentence.

7. The language model training apparatus according to claim 1, wherein the processing circuitry applies the first token sequence to the teacher model and calculates a first feature amount and a first inference result, applies the second token sequence to the student model and calculates a second feature amount and a second inference result, and updates a parameter of the student model based on the position information, the first feature amount, the first inference result, the second feature amount, and the second inference result.

8. The language model training apparatus according to claim 7, wherein the processing circuitry updates the parameter using a final loss that is a weighted sum of a similarity loss and an MLM loss, the similarity loss represents a similarity between the first feature amount and the first inference result from the teacher model and the second feature amount and the second inference result from the student model, and the MLM loss represents a cross entropy of the second inference result from the student model and a correct label.

9. The language model training apparatus according to claim 8, wherein a first weight with respect to the similarity loss and a second weight with respect to the MLM loss are adjustable.

10. The language model training apparatus according to claim 8, wherein the processing circuitry, based on the position information, separates a first known feature amount and an inference result regarding a known word and a first new feature amount and an inference result regarding a new word from the first feature amount and the first inference result, and separates a second known feature amount and an inference result regarding a known word and a second new feature amount and an inference result regarding a new word from the second feature amount and the second inference result, and calculates the final loss based on the first known feature amount and the inference result, the first new feature amount and the inference result, the second known feature amount and the inference result, and the second new feature amount and the inference result.

11. The language model training apparatus according to claim 8, wherein the similarity loss includes a weighted sum of a first similarity and a second similarity, the first similarity represents a similarity between the first feature amount from the teacher model and the second feature amount from the student model, and the second similarity represents a similarity between the first inference result from the student model and the second inference result from the student model.

12. The language model training apparatus according to claim 8, wherein in a case where a value of the similarity loss is less than an allowable value, the similarity loss is set to 0.

13. The language model training apparatus according to claim 12, wherein in a case where a value of the similarity loss is equal to or greater than the allowable value, the similarity loss is set to a value obtained by subtracting the allowable value from the value of the similarity loss.

14. The language model training apparatus according to claim 1, wherein the language model predicts a token sequence that is a sequence of an identifier of a word before being processed with a predetermined probability from a token sequence that is a sequence of an identifier of a word after being processed with the predetermined probability.

15. A language model training method comprising:

obtaining a target sentence including a sequence of a word that is a known word or a new word;

generating position information of a new word included in the target sentence and a token sequence that is a sequence of an identifier of the word included in the target sentence, wherein the token sequence includes a first token sequence for a teacher model among a language model and a second token sequence for a student model among the language model, and the first token sequence and the second token sequence are different in at least some of a processed word, and training of updating a parameter of the student model utilizing knowledge distillation from the teacher model to the student model based on the position information, the first token sequence, and the second token sequence, wherein generating the position information further comprises generating the first token sequence by masking the new word with a first probability, and generating the second token sequence by masking the new word with a second probability lower than the first probability.

16. A non-transitory computer readable medium including computer executable instructions, wherein the instructions, when executed by a processor, cause the processor to perform operations comprising:

obtaining a target sentence including a sequence of a word that is a known word or a new word;

generating position information of a new word included in the target sentence and a token sequence that is a sequence of an identifier of the word included in the target sentence, wherein the token sequence includes a first token sequence for a teacher model among a language model and a second token sequence for a student model among the language model, and the first token sequence and the second token sequence are different in at least some of a processed word; and updating a parameter of the student model utilizing knowledge distillation from the teacher model to the student model based on the position information, the first token sequence, and the second token sequence, wherein generating the position information further comprises generating the first token sequence by masking the new word with a first probability, and generating the second token sequence by masking the new word with a second probability lower than the first probability.

* * * * *